United States Patent [19]

Kojima et al.

[11] Patent Number: 5,318,761
[45] Date of Patent: Jun. 7, 1994

[54] PROCESS FOR PREPARING SILICON CARBIDE POWDER FOR USE IN SEMICONDUCTOR EQUIPMENT

[75] Inventors: Shoichi Kojima, Tokyo; Kazuhiro Minagawa, Chiba; Tasuku Saito, Tokorozawa; Tasuo Kurachi, Tokyo; Haruyuki Kano, Kashima, all of Japan

[73] Assignees: Sumitomo Metal Industries, Ltd., Osaka; Bridgestone Corporation, Tokyo, Japan

[21] Appl. No.: 913,951

[22] Filed: Jul. 17, 1992

[30] Foreign Application Priority Data

Jul. 18, 1991 [JP] Japan .................................. 3-178389

[51] Int. Cl.$^5$ ............................................ C04B 35/54
[52] U.S. Cl. .................................... 423/345; 301/88
[58] Field of Search ................ 501/88, 89; 423/345; 264/63

[56] References Cited

U.S. PATENT DOCUMENTS

| | | |
|---|---|---|
| 4,110,386 | 8/1978 | Yajima .................. 264/29.5 |
| 4,529,575 | 7/1985 | Enomoto et al. ............... 423/345 |
| 4,571,331 | 2/1986 | Endou et al. .............. 423/345 |
| 4,610,858 | 9/1986 | Yamada et al. ............... 423/342 |
| 4,619,798 | 10/1986 | Tanaka et al. .................... 264/62 |
| 4,702,900 | 10/1987 | Kurachi et al. ............... 423/345 |
| 5,093,039 | 3/1992 | Kijima et al. ................. 252/516 |
| 5,179,049 | 1/1993 | Numata et al. .................. 501/88 |

FOREIGN PATENT DOCUMENTS

| | | |
|---|---|---|
| 0165554 | 12/1985 | European Pat. Off. . |
| 57-88019 | 6/1982 | Japan . |
| 58-18325 | 4/1983 | Japan . |
| 58-34405 | 7/1983 | Japan . |
| 61-6110 | 1/1986 | Japan . |
| 1-42886 | 9/1989 | Japan . |

OTHER PUBLICATIONS

Japanese Abstract of JP-A-60-266,406, Nov. 11, 1985.
Japanese Abstract of JP-A-61-132,509, Jun. 20, 1986.
H. Tanaka et al., Synthesis and Sintering of SiC-C Powder Mixture from Si(OCH$_3$)$_4$ and Rheno Resin; *Journal of the Ceramic Society of Japan*, vol. 98-616, pp. 86-89 (Jun. 1990).

*Primary Examiner*—Helene Klemanski
*Assistant Examiner*—A. Wright
*Attorney, Agent, or Firm*—Burns, Doane, Swecker & Mathis

[57] ABSTRACT

A process for the preparation of a beta-silicon carbide powder of high purity which is suitable for use in the manufacture of semiconductor equipment and which has a content of 1 ppm or less of each atom harmful to the manufacture of semiconductor devices. The process comprises preparing a carbon- and silicon-containing starting mixture comprising (a) at least one siliceous material selected from liquid silicon compounds and solid siliceous substances derived from a hydrolyzable silicon compound, and (b) at least one carbonaceous material selected from polymerizable or cross-linkable organic compounds prepared in the presence of a catalyst which is substantially free from atoms harmful to the manufacture of semiconductor devices. The starting mixture comprises at least one liquid substance used as component (a) or (b). The starting mixture is then solidified by heating and/or by use of a catalyst or a curing agent. The resulting solid body is optionally heat treated in a non-oxidizing atmosphere at a temperature in the range of from 500° C. to 1300° C. for a period sufficient to remove volatiles. The cured and optionally heat-treated body is calcined in a non-oxidizing atmosphere under conditions sufficient to give beta-silicon carbide powder.

24 Claims, No Drawings

PROCESS FOR PREPARING SILICON CARBIDE POWDER FOR USE IN SEMICONDUCTOR EQUIPMENT

BACKGROUND OF THE INVENTION

The present invention relates to a process for preparing a silicon carbide powder having a purity sufficient for its use in semiconductor device-manufacturing equipment (hereinafter merely referred to as "semiconductor equipment"). Semiconductor equipment is used to carry silicon wafers or similar substrates and shield them from air in the manufacture of semiconductor devices such as integrated circuits. Semiconductor equipment usually includes one or more wafer carriers (called boats) and tubes and other parts. The manufacture of semiconductor devices usually involves one or more heat treatment steps at high temperatures such as oxidation, CVD, PVD, SOI (silicon on insulator), or thermal diffusion of an impurity as a dopant, so semiconductor equipment is required to resist such high-temperature atmospheres.

Semiconductor equipment which has conventionally been used is usually made of quartz glass (fused silica) or silicon. Semiconductor equipment made of quartz glass has a quite limited service life under the conditions existing during heat treatment at a high temperature since it is susceptible to deformation or distortion during heat treatment due to the relatively low softening point of quartz glass which is in the vicinity of 1100° C. Furthermore, when kept at a high temperature for a prolonged period, it may become devitrified and broken due to phase transition into alpha-cristobalite.

Semiconductor equipment made of silicon has the problem that it is contaminated with the impurities used as dopants in thermal diffusion steps by undesirable diffusion of the impurities into the equipment. The impurities build up in the equipment during use, thereby causing contamination of wafers which are being processed therein.

Silicon carbide (SiC) is chemically stable and resistant to corrosion at high temperatures and its strength and stiffness are much higher than those of quartz glass. In view of these properties, semiconductor equipment made of sintered silicon carbide is sometimes used. However, such semiconductor equipment is rarely used in processing of silicon wafers of high quality which are sensitive to metallic impurities, since presently available silicon carbide contains a considerable amount of metallic impurities, which are often evaporated to generate a gas during thermal diffusion treatment, resulting in contamination of wafers.

Accordingly, there is a need for pure silicon carbide powder which is substantially free from metallic impurities, i.e., with a content of 1 ppm or less for each metallic impurity, as a raw material for sintered silicon carbide.

Silicon carbide has two crystal forms, alpha-form (hexagonal) and beta-form (cubic), of which beta-silicon carbide in powder form, which has a structure similar to diamond, is more suitable for use in the manufacture of semiconductor equipment. Known methods used to prepare beta-silicon carbide powder involve (1) a reaction of $SiO_2$ with C, (2) a reaction of metallic Si with C, or (3) a vapor phase reaction of an Si compound, e.g., $SiCl_4$, with a hydrocarbon. Method (1) is used in commercial production of beta-silicon carbide powder since the starting materials are inexpensive and the reaction can be easily controlled.

The preparation of beta-silicon carbide powder by a reaction of $SiO_2$ with C proceeds through either the following

| reaction scheme (a) or (b) at a high temperature: |
|---|
| Reaction Scheme (a): $SiO_2 + 3C \rightarrow SiC + 2CO(g)$ |
| Reaction Scheme (b): $SiO_2 + C \rightarrow SiO(g) + CO(g)$ |
| $SiO(g) + 2C \rightarrow SiC + CO(g)$ | where (g) means that the material is in a gaseous phase.

Of these reaction schemes, scheme (a) is usually employed because scheme (b) includes a heterogeneous solid-vapor reaction, thereby making it difficult to form a uniform powder product having even particle diameters, and the product of reaction scheme (b) is contaminated with a small amount of alpha-silicon carbide.

The most popular process for the preparation of beta-silicon carbide powder using the above-described reaction scheme (a) is the Acheson process. The Acheson process comprises reacting a siliceous material ($SiO_2$ or its precursor) and a carbonaceous material (C or its precursor) by heating a mixture of these two solid materials in powdery form in a batchwise electric-resistance furnace known as an Acheson-type furnace to produce silicon carbide in lumps. The Acheson process has the drawbacks of poor operating efficiency and a deteriorated work environment since it requires the removal of a side wall of the furnace for the recovery of the product in each reaction cycle. Moreover, each of the solid starting materials contains an appreciable amount of impurities, and since the resulting silicon carbide product in lumps must be pulverized into powder, additional metallic impurities are incorporated into the powder product during pulverization of the hard, lump silicon carbide. Therefore, the Acheson process has another significant drawback that the product is inevitably contaminated with a considerable amount of impurities.

In order to improve the operating efficiency, it has been proposed in Japanese Patent Publication No. 58-18325(1983) and No. 58-34405(1983) that a mixture of the powdery starting materials be shaped by use of a binder such as pitch, thereby making it possible to directly produce a beta-silicon carbide powder without a pulverization step. Japanese Patent Application Kokai No. 61-6110(1986) discloses an improved continuous process for the preparation of beta-silicon carbide powder which comprises preparing a starting mixture consisting of a solid siliceous material, a solid carbonaceous material, a liquid silicon compound, and a curable organic compound having polymerizable or cross-linkable functional groups, preheating the starting mixture so as to cure the organic compound and solidify the mixture, and calcining the solidified mixture in a non-oxidizing atmosphere.

It is also known that a starting mixture is homogenized using a liquid starting material in order to produce a silicon carbide powder having a uniform particle diameter or shape. For example, it is proposed in Japanese Patent Application Kokai No. 57-88019(1982) to prepare a starting mixture by treating a carbonaceous material with a silicic acid solution and calcining the mixture in a non-oxidizing atmosphere. Preferably, the carbonaceous material is also a liquid substance and the mixture is prepared in a liquid state. A small amount of silica sol is undesirably formed in the starting mixture and adversely affects the quality of the product. In order to eliminate this drawback, it is disclosed in Japanese Patent Publication No. 1-42886(1989) to use a mixture comprising a liquid siliceous material, a curable or polymerizable liquid organic compound capable of forming carbon upon heating, and a polymerization or curing catalyst which is compatible with the liquid organic compound to form a homogeneous solution. The mixture is reacted to form a cured body containing Si, O, and C as an SiC precursor, which is then calcined in a non-oxidizing atmosphere to give a beta-silicon carbide powder.

However, in the above-described prior-art processes for preparation of beta-silicon carbide powder, it was difficult or impossible to produce a beta-silicon carbide powder of high purity having a content of 1 ppm or less for each metallic impurity, a purity level which is accepted in the manufacture of semiconductor equipment. It has been found that the final products obtained in these processes are contaminated with metallic impurities in considerable amounts, e.g., on the order of 3 ppm or more for one or more impurity metals, and this level of contamination is not acceptable in semiconductor equipment. Although washing is an effective means for removing impurities, it is quite difficult in a commercial process to decrease an impurity level to 1 ppm or less by washing.

SUMMARY OF THE INVENTION

It is an object of the present invention to provide a process for preparing a silicon carbide powder sufficiently pure for use in the manufacture of semiconductor equipment.

A more specific object of the invention is to provide a process for preparing a silicon carbide powder having an impurity content of 1 ppm or less of each metallic impurity known to be harmful in the manufacture of semiconductor devices.

The present inventors found that most of the metallic impurities found in a beta-silicon carbide powder come from the carbonaceous starting material. Namely, siliceous starting materials can be readily purified by a method suitable for a commercial process such that highly pure siliceous materials which are substantially free from harmful impurities which interfere with the manufacture of semiconductor devices can be obtained. In contrast, organic resins such as, phenolic resins, which are suitable for use as solid carbonaceous materials, contain a considerable amount of harmful impurities originating from the catalyst used in the preparation of the resins and it is difficult to decrease the impurity level to 1 ppm or less, for example, by a commercially-adoptable purification technique. Furthermore, carbon tends to readily adsorb metals. Therefore, harmful metallic impurities inevitably remain in the resulting silicon carbide powder obtained as a final product.

Upon further investigation, it was found that the desired beta-silicon carbide powder of high purity can be prepared by using an organic substance which has been made in the absence of a metallic catalyst and which is curable by polymerization or crosslinking.

The present invention provides a process for the preparation of a beta-silicon carbide powder suitable for use in the manufacture of semiconductor equipment and having a content of 1 ppm or less of each atom harmful to the manufacture of semiconductor devices, the process comprising the steps of preparing a carbon- and silicon-containing starting mixture comprising (a) at least one siliceous material selected from liquid hydrolyzable silicon compounds and solid siliceous substances derived from a hydrolyzable silicon compound, and (b) at least one carbonaceous material selected from polymerizable or cross-linkable organic compounds prepared in the presence of a catalyst which is substantially free from atoms harmful to the manufacture of semiconductor devices, at least one material used as component (a) or (b) being a liquid substance; forming a solid body containing carbon and silicon by solidifying the starting mixture by heating and/or by use of a catalyst or a curing agent; and reacting the carbon with the silicon in the solid body and forming beta-silicon carbide powder, the reacting step being carried out by calcining the solid body at a reacting temperature in a non-oxidizing atmosphere under conditions sufficient to give beta-silicon carbide powder.

DETAILED DESCRIPTION OF THE INVENTION

The atoms harmful to the manufacture of semiconductor devices (hereinafter referred to as 37 harmful atoms") are those atoms which can be incorporated in silicon wafers by vaporization, e.g., in the form of chlorides, during heat treatment of the wafers, thereby deteriorating the insulation resistance of the wafers or the dielectric strength of an $SiO_2$ film formed thereon.

Specific examples of such harmful atoms include heavy metal atoms such as Fe, Ni, Cu, Cr, and V, alkali metal atoms such as Na K, and alkaline earth metal atoms such as Mg and other metal atoms as B.

The starting mixture used in the process of this invention is a mixture comprising (a) at least one siliceous material selected from liquid silicon compounds and solid siliceous substances derived from a hydrolyzable silicon compound, and (b) at least one carbonaceous material selected from polymerizable or cross-linkable organic compounds prepared in the presence of a catalyst which is substantially free from harmful atoms. At least one liquid substance is used as component (a) or (b) in the starting mixture. In order to assure the preparation of the desired beta-silicon carbide powder having a content of 1 ppm or less of each harmful atom, it is preferred to control the content of each harmful atom to 1 ppm or less in all the siliceous and carbonaceous starting materials used.

The liquid silicon compounds useful as component (a) in the starting mixture include (1) a class of polymers prepared by tri-methylation of a hydrolyzable silicic acid derivative (e.g., silicon tetrachloride), (2) esters prepared by a reaction of a hydrolyzable silicic acid derivative with a monohydric alcohol or a polyhydric alcohol such as a diol or triol (e.g., an alkyl silicate such as ethyl silicate prepared by a reaction of silicon tetrachloride with ethanol), and (3) non-ester reaction products prepared by a reaction of a hydrolyzable silicon compound with an organic compound (for example, tetramethylsilane, dimethyl-diphenylsilane, or polydimethylsilane). It is preferred that the liquid silicon compounds have a content of 1 ppm or less for each harmful atom by using reactants which are free of harmful atoms and optionally a catalyst which is also free of harmful atoms in the preparation of the silicon compounds.

Similarly, it is preferred that the solid siliceous substances derived from a hydrolyzable silicon compound which are also useful as component (a) in the starting mixture have a content of 1 ppm or less of each harmful atom. Any solid siliceous substance capable of reacting with carbon at a high temperature in a non-oxidizing atmosphere to form silicon carbide can be used. A preferred example of such a solid siliceous substance is fine powder of amorphous silica which is derived from silicon tetrachloride by hydrolysis.

Component (b) is at least one organic curable compound which is capable of polymerizing or cross-linking by heating and/or with the aid of a catalyst to form a cured high polymer and which is a monomer, oligomer, or polymer prepared in the presence of a catalyst which is substantially free from harmful atoms. Preferred examples of such an organic compound are thermosetting or curable resins such as phenolic resins, furan resins, urea resins, epoxy resins, unsaturated polyester resins, polyimide resins, and polyurethane resins prepared in the presence of a catalyst free of harmful atoms. Among others, phenolic resins which are either resol or novolak resins are particularly preferred due to their high degree of carbon retention and good handling properties.

Useful resol resins can be prepared by reacting a monohydric or dihydric phenol such as phenol, cresol, xylenol, resorcinol, or bisphenol-A with an aldehyde such as formaldehyde, acetaldehyde, or benzaldehyde in the presence of ammonia or an organic amine as a catalyst free from harmful atoms. Common resol resins are prepared by use of an alkali metal compound as a catalyst and contain one or more harmful atoms at a concentration of more than 1 ppm, so they are not suitable for use in the present invention as a starting material.

The organic amine which can be used as a catalyst free from harmful atoms includes primary, secondary, and tertiary amines. Specific examples of useful amines include dimethylamine, trimethylamine, diethylamine, triethylamine, dimethylmonoethanolamine, monomethyldiethanolamine, N-methylaniline, pyridine, and morpholine. The preparation of a resol resin in the presence of ammonia or an organic amine as a catalyst can be performed in a conventional manner except for the use of a different catalyst, such as by adding from 1 to 3 moles of an aldehyde and from 0.02 to 0.2 moles of ammonia or an organic amine to each mole of a phenol and heating the mixture at 60°-100° C.

Useful novolak resins can be prepared from a monohydric or dihydric phenol and an aldehyde which are the same reactants as used in the preparation of resol resins, but using an inorganic or organic acid free from harmful atoms as a catalyst. Examples of such an acid catalyst include hydrochloric acid, sulfuric acid, p-toluenesulfonic acid, and oxalic acid. The preparation of these novolak resins can be performed in a conventional manner, such as by adding from 0.5 to 0.9 moles of an aldehyde and from 0.02 to 0.2 moles of an inorganic or organic acid free from harmful atoms to each mole of a phenol and heating the mixture at 60°-100° C.

At least one of siliceous component (a) and carbonaceous component (b) used in the starting mixture is a liquid substance. Preferably all the components are liquid substances. For example, a liquid silicon compound is used as component (a) and/or a liquid resin such as a liquid resol-type phenolic resin is used as component (b). When a solid substance such as a novolak-type phenolic resin is used, it may be used in liquid form by dissolving it in an appropriate organic solvent. If all the components constituting the starting mixture are solid substances, it is difficult to uniformly mix the components and the resulting silicon carbide powder obtained after calcining has poor uniformity with respect to particle diameter and shape.

The starting mixture for the preparation of silicon carbide is prepared by admixing at least one component (a) (siliceous material) with at least one component (b) (carbonaceous material), and a polymerization or curing catalyst or a cross-linking agent is added to the mixture, if necessary. When component (b) is a liquid substance such as a resol resin, a uniform starting mixture can be obtained by mixing components (a) and (b) preferably under thorough stirring. When component (b) is a solid substance such as a novolak resin, it is preferred to dissolve the solid component (b) in an appropriate solvent, e.g., an alcohol for a novolak resin and admix the resulting solution with component (a) preferably under thorough stirring.

When the organic compound used as component (b) is curable merely by heating, it is not necessary to add a polymerization or curing catalyst. In most cases, a polymerization or curing catalyst or a cross-linking agent is added to the starting mixture and uniformly distributed therein by mixing. The catalyst should be a polymerization or curing catalyst which is substantially free from harmful atoms. For example, an inorganic acid such as hydrochloric acid or sulfuric acid, an organic peroxide, or an organic sulfonic acid can be used as a curing catalyst for resol resins. When a novolak resin is used as component (b), hexamethylenetetramine or a similar polyamine can be added as a cross-linking agent.

The starting mixture prepared in the above-described manner is then solidified either by letting at stand at room temperature or by heating it so as to cure component (b) in the mixture by a polymerization or cross-linking reaction, resulting in the formation of a uniform solid body which contains Si, C, and oxygen and which serves as a silicon carbide precursor. When component (b) is a resol or novolak resin, for example, curing of the resin usually proceeds by mere standing. When the starting mixture is heated, the heating temperature can be selected depending on the particular organic compound and catalyst or cross-linking agent used such that the temperature is sufficient to cause curing of component (b) but not sufficient to cause degradation or carbonization of the resin component (b). The heating atmosphere is not critical and may be either air or a non-oxidizing atmosphere.

The resulting solid cured body as a silicon carbide precursor is then calcined in a non-oxidizing atmosphere, e.g., in vacuum, nitrogen, helium, or argon, to cause carbonization and silicification of the body, resulting in the formation of the desired beta-silicon carbide powder. The heating temperature is not critical as long as it is enough for reacting the carbon and silicon to form silicon carbide, but it is usually in the range of about 1600°-2000° C. and preferably about 1750°-1950° C.

Prior to calcining, the solid cured body may be pretreated by heat treatment under conditions sufficient to remove volatiles from the solid body to be calcined. Preferably the heat treatment is performed at a temperature in the range of from 500° C. to 1300° C. and more preferably in the range of 800°-1000° C. for a period sufficient to remove volatiles which are primarily present in the organic resin component (b) and which do not participate in carbonization. Such preliminary heat treatment prior to calcining is effective for improving the operating efficiency for some resins used as component (b) and it is preferably performed in a non-oxidizing atmosphere as exemplified above. When the resin used as component (b) does not contain a large amount of volatiles, the solid cured body can be directly calcined in a non-oxidizing atmosphere without preliminary heat treatment.

The heating rates in the preliminary heat treatment and calcining steps are not critical.

The proportions of the siliceous material [component (a)] and carbonaceous material [component (b)] in the starting mixture can be decided on the basis of the C/Si atomic ratio determined on a sample of the starting mixture after it is cured and the cured solid body is heat treated at a temperature in the range of 800°–1400° C. so as to form a volatile-free heat-treated mass. It is desirable to choose the proportions of components (a) and (b) such that the C/Si atomic ratio of the heat-treated mass is between 1 and 10, preferably between 2 and 6, and more preferably approximately 3. Since part of carbon originally present in the carbonaceous material has been lost as volatiles during heat treatment, the amount of component (b) which is actually mixed with component (a) should be selected by considering the degree of carbon retention after the heat treatment. Thus, component (b) is used in an amount which is the sum of the amount determined from the C/Si ratio of a heat-treated mass plus the amount corresponding to the volatility loss in the heat treatment. The purpose of the heat treatment at a temperature of 800°–1400° C. in a non-oxidizing atmosphere is merely to determine the C/Si ratio in a heat-treated mass for use as an indicator to select the proportions of components (a) and (b). Therefore, such heat treatment is not necessary in the actual preparation process according to the present invention, although heat treatment may optionally be applied to a solid cured body at a temperature of 500°–1300° C. prior to calcining, as described above.

When a solid material such as a solid hydrolyzable siliceous substance is incorporated in the starting mixture, it is preferred that the total proportion of liquid materials (including a solution of a solid material dissolved in an appropriate solvent) be at least 5% by weight based on the total weight of the starting mixture since the uniformity of the starting mixture is degraded in the presence of a liquid material in a proportion of less than 5% by weight. The total proportion of liquid materials is more preferably at least 15% and most preferably 100% by weight of the starting mixture.

In accordance with the process of the present invention, the product obtained after the calcining step is beta-silicon carbide in the form of a fine powder having a relatively uniform particle diameter and shape. The proportion of alpha-silicon carbide incorporated in the product is less than 1% as determined by powder X-ray diffraction analysis. It is possible to obtain a powder product comprised solely of beta-silicon carbide by proper selection of the reaction conditions. The average particle diameter of the powder product varies between 0.5–1,000 μm and preferably 0.5–100 μm depending primarily on the calcining temperature.

By using an organic curable compound prepared in the presence of a catalyst free from harmful atoms as component (b) and preferably using a highly pure siliceous material having a content of 1 ppm or less for each harmful atom as component (a), the product is a beta-silicon carbide powder of high purity having a content of 1 ppm or less of each harmful atom. The maximum acceptable impurity level of 1 ppm has been determined by various tests which are presently employed to examine contamination of silicon wafers including the lifetime method and the X-ray transmission method. Thus, it has been confirmed that the presence of harmful atoms in a beta-silicon carbide powder in an amount of 1 ppm or less does not appreciably contaminate silicon wafers during processing in a semiconductor equipment formed from the powder by sintering.

The beta-silicon carbide powder prepared in accordance with the process of the present invention is highly pure as described above and is of a quality suitable for use as sintering powder in the manufacture of semiconductor equipment as it is, i.e., without pulverizing and washing or other purification treatment. Semiconductor equipment can be manufactured by shaping the silicon carbide powder after adding thereto one or more suitable additives such as a binder which are also free from harmful atoms. The shaped body is sintered, and the sintered body is then machined to form various parts of semiconductor equipment such as boats, tubes, and other parts.

The resulting semiconductor equipment made of sintered silicon carbide exhibits good stability, corrosion resistance, and strength at high temperatures, which are characteristics inherent to silicon carbide. Furthermore, it is of high purity and does not cause contamination of silicon wafers during wafer processing including heat treatment such as thermal diffusion treatment. Therefore, it can be successfully used in the manufacture of semiconductor devices using silicon wafers or similar substrates of high quality.

The following examples are presented to further illustrate the present invention. These examples are to be considered in all respects as illustrative and not restrictive. In the examples, the percents and parts are by weight unless otherwise indicated.

EXAMPLE 1

In this example, a liquid silicon compound in the form of ethyl silicate and a resol-type phenolic resin containing 65% nonvolatiles were used as starting materials. The ethyl silicate comprised 40% $SiO_2$ based on the total weight of the compound and was substantially free from harmful atoms. The phenolic resin (referred to as phenolic resin A) was prepared by reacting pure phenol and formaldehyde in a conventional manner except that triethylamine was used as a catalyst.

Sixty-two (62) parts of ethyl silicate were uniformly mixed with 38 parts of phenolic resin A, and 16 parts of an aqueous 33% p-toluenesulfonic acid solution which was substantially free from harmful atoms were added to the mixture and thoroughly stirred to give a homogeneous starting mixture. The starting mixture was allowed to stand at room temperature for about 30 minutes until the phenolic resin was cured to give a solid body. The resulting resin-like solid cured body was placed in an electric furnace and heated to 1000° C. at a rate of 10° C./min in a nitrogen atmosphere to give a volatile-free heat-treated body which was a dense, homogeneous solid having a C/Si ratio of about 3 which was estimated on the basis of the degree of carbon retention after the heat treatment. The heat-treated body was then heated to 1800° C. at a rate of 10° C./min in an argon atmosphere within the same electric furnace and kept at that temperature for 30 minutes for calcining to form silicon carbide. Thereafter, the silicon carbide powder formed as a calcined product was allowed to cool to 1600° C. within the electric furnace and kept at that temperature for 4 hours. After the powder product was allowed to cool to room temperature, it was removed from the electric furnace. The resulting silicon carbide powder was found to be comprised substantially solely of beta-silicon carbide as measured by powder X-ray diffraction analysis and had an average particle diameter of about 5 μm. The impurity level of the silicon carbide powder product (indicated as silicon carbide A) determined by radioactivation analysis and that of the phenolic resin A determined by atomic absorption spectroscopy are shown in Table 1.

COMPARATIVE EXAMPLE 1

Following the procedure described in Example 1 except that the carbonaceous material used was a resol-type phenolic resin (referred to as phenolic resin B) which was prepared in the presence of sodium hydroxide as a conventional catalyst in place of the triethylamine used in Example 1, a silicon carbide powder product was prepared. The powder product was found to be comprised substantially solely of beta-silicon carbide, and it had an average particle diameter of about 5 μm. The impurity level of the silicon carbide powder product (indicated as silicon carbide B) determined by radioactivation analysis and that of the phenolic resin B determined by atomic absorption spectroscopy are also shown in Table 1.

TABLE 1

| Sample | Harmful Impurity Atoms | | | | | | | |
|---|---|---|---|---|---|---|---|---|
| | Na | K | Ca | Fe | Ni | Cu | Cr | V |
| Silicon Carbide A | <1 | <1 | <1 | <1 | <1 | <1 | <1 | <1 |
| Silicon Carbide B | 4 | <1 | <1 | 5 | <1 | <1 | <1 | <1 |
| Phenolic Resin A | — | — | <1 | <0.1 | <0.1 | <0.1 | <0.1 | <0.1 |
| Phenolic Resin B | 3400 | — | <1 | 11.6 | <0.1 | 0.1 | <0.1 | <0.1 |

As is apparent from the results shown in Table 1, the silicon carbide powder product prepared in Example 1 (silicon carbide A) by using as a carbonaceous material a phenolic resin which had a content of 1 ppm or less for each harmful atom and which had been prepared in the presence of a catalyst free from harmful atoms in accordance with the present invention had a very high purity in which the content of each harmful atom was limited to less than 1 ppm. In contrast, when the phenolic resin used as a carbonaceous material was prepared in the presence of a conventional catalyst such as sodium hydroxide as in Comparative Example 1, the total content of harmful atoms in the resulting silicon carbide powder product (silicon carbide B) significantly increased to nearly 10 ppm due to the presence of harmful atoms in the phenolic resin and the quality of the product was no longer suitable for use in the manufacture of semiconductor equipment.

EXAMPLE 2

In this example, a solid siliceous substance was used as an additional starting material along with the ethyl silicate having a 40% content of $SiO_2$ and the highly pure resol-type phenolic resin A containing 65% non-volatiles used in Example 1. Amorphous silica fine powder having a 100% content of $SiO_2$ prepared by hydrolysis of silicon tetrachloride was used as the solid siliceous substance. It was of high purity and substantially free from harmful atoms.

A dispersion-like starting mixture was prepared by mixing 47 parts of ethyl silicate, 38 parts of phenolic resin A, and 15 parts of amorphous silica. A catalyst solution prepared by diluting 15 parts of p-toluenesulfonic acid free from harmful atoms (first class reagent grade) twice with deionized water was added to the starting mixture and vigorously stirred until the starting mixture cured into a solid body. The resulting cured solid body was then heat-treated and calcined in the same manner as described in Example 1 to give a silicon carbide powder of high purity (indicated as silicon carbide C). This silicon carbide powder was found to be comprised substantially solely of beta-silicon carbide as measured by powder X-ray diffraction analysis, and it had an average particle diameter of about 7 μm. The impurity level of the silicon carbide powder product determined by radioactivation analysis is shown in Table 2. As can be seen from Table 2, a high-quality beta-silicon carbide powder product having a content of less than 1 ppm for each harmful atom could be obtained.

TABLE 2

| Sample | Harmful Impurity Atoms | | | | | | | |
|---|---|---|---|---|---|---|---|---|
| | Na | K | Ca | Fe | Ni | Cu | Cr | V |
| Silicon Carbide C | <1 | <1 | <1 | <1 | <1 | <1 | <1 | <1 |

It will be appreciated by those skilled in the art that numerous variations and modifications may be made to the invention as described above without departing from the spirit or scope of the invention.

What is claimed is:

1. A process for the preparation of a beta-silicon carbide powder suitable for use in the manufacture of semiconductor equipment and having a content of 1 ppm or less for each of alkali metal, alkaline earth metal and heavy metal atoms which are harmful to the manufacture of semiconductor devices, comprising the steps of:

preparing a carbon- and silicon-containing starting mixture comprising (a) at least one siliceous material selected from liquid hydrolyzable silicon compounds and solid siliceous substances derived from a hydrolyzable silicon compound, and (b) at least one carbonaceous material selected from polymerizable or cross-linkable organic compounds prepared in the presence of a catalyst, said catalyst being substantially free from said atoms harmful to the manufacture of semiconductor devices, at least one material used as component (a) or (b) being a liquid substance;

forming a solid body containing carbon and silicon by solidifying the starting mixture by heating, by use of a catalyst or a curing agent, or by both heating and by use of a catalyst or curing agent; and reacting the carbon and the silicon in the solid body and forming beta-silicon carbide powder, the reacting step being carried out by calcining the solid body at a reacting temperature in a non-oxidizing atmosphere.

2. The process according to claim 1, which further comprises the step of removing volatiles from the solid body by heating the solid body to a temperature at which substantially no reaction takes place between the silica and the carbon in the solid body.

3. The process according to claim 1, wherein all the components constituting the starting mixture have a content of 1 ppm or less for each of alkali metal, alkaline earth metal and heavy metal atoms which are harmful to the manufacture of semiconductor devices.

4. The process according to claim 1, wherein the liquid hydrolyzable silicon compound is selected from (1) polymers prepared by trimethylation of a hydrolyzable silicic acid derivative; and (2) esters prepared by a reaction of a hydrolyzable silicic acid derivative with a monohydric alcohol or a polyhydric alcohol.

5. The process according to claim 4, wherein the liquid silicon compound is an alkyl silicate.

6. The process according to claim 1, wherein the solid siliceous substance is fine powder of amorphous silica prepared by hydrolysis of a hydrolyzable silicon compound.

7. The process according to claim 1, wherein the siliceous material is a liquid hydrolyzable silicon compound or a mixture of a liquid hydrolyzable silicon compound with a solid siliceous substance.

8. The process according to claim 1, wherein the carbonaceous material is selected from thermosetting resins including phenolic resin, furan resins, urea resins, epoxy resins, unsaturated polyester resins, polyimide resins, and polyurethane resins.

9. The process according to claim 8, wherein the carbonaceous material is selected from the group consisting of phenolic resins and furan resins prepared in the presence of a non-metallic catalyst.

10. The process according to claim 9, wherein the phenolic resin is a resol resin prepared in the presence of ammonia or an amine as a catalyst.

11. The process according to claim 9, wherein the phenolic resin is a novolak resin prepared in the presence of an inorganic or organic acid.

12. The process according to claim 11, wherein the novolak resin is used in the form of a solution dissolved in an alcohol.

13. The process according to claim 1, wherein the starting mixture further comprises a polymerization or curing catalyst or a cross-linking agent.

14. The process according to claim 1, wherein the proportions of the siliceous and carbonaceous materials in the starting mixture are such that the C/Si atomic ratio is between 1 and 10 for a sample of the starting mixture after the sample has been cured and heat-treated at a temperature in the range of 800°–1400° C. to remove volatiles.

15. The process according to claim 14, wherein the C/Si atomic ratio is between 2 and 6.

16. The process according to claim 15, wherein the C/Si atomic ratio is approximately 3.

17. The process according to claim 2, wherein the heating to remove volatiles is performed at a temperature in the range of from 500° C. to 1300° C. in a non-oxidizing atmosphere.

18. The process according to claim 17, wherein the heating to remove volatiles is performed at a temperature in the range of from 800° C. to 1000° C.

19. The process according to claim 1, wherein the reacting step to form beta-silicon carbide is performed at a reacting temperature of from about 1600° C. to about 2000° C.

20. The process according to claim 19, wherein the reacting temperature is from about 1750° C. to about 1950° C.

21. The process according to claim 1, wherein the beat-silicon carbide powder contains less than 1% alpha-silicon carbide.

22. The process according to claim 1, wherein the beta-silicon carbide powder has an average particle diameter of 0.5–100 μm.

23. The process according to claim 1, wherein the beta-silicon carbide powder has $\leq 1$ ppm Fe, $\leq 1$ ppm Ni, $\leq 1$ ppm Cu, $\leq 1$ ppm, Cr, $\leq 1$ ppm V, $\leq 1$ ppm Na, $\leq 1$ ppm K, $\leq 1$ ppm B and $\leq 1$ ppm Mg.

24. The process according to claim 1, further comprising a step of sintering the beta-silicon carbide powder, the sintering step being carried out by mixing said powder with one or more additives substantially free from said harmful atoms.

* * * * *

UNITED STATES PATENT AND TRADEMARK OFFICE
CERTIFICATE OF CORRECTION

PATENT NO. : 5,318,761

DATED : June 7, 1994

INVENTOR(S) : Shoichi KOJIMA et al

It is certified that error appears in the above-identified patent and that said Letters Patent is hereby corrected as shown below:

On title page, item [75], delete "Tasuo" and insert --Yasuo--.

Signed and Sealed this

Sixth Day of September, 1994

Attest:

BRUCE LEHMAN

Attesting Officer

Commissioner of Patents and Trademarks